United States Patent
Klomp et al.

(10) Patent No.: US 8,675,081 B2
(45) Date of Patent: Mar. 18, 2014

(54) REAL TIME VIDEO STABILIZATION

(75) Inventors: Harald Klomp, Uppsala (SE); Anders Frisk, Uppsala (SE)

(73) Assignee: Imint Image Intelligence AB, Uppsala (SE)

( * ) Notice: Subject to any disclaimer, the term of this patent is extended or adjusted under 35 U.S.C. 154(b) by 0 days.

(21) Appl. No.: 13/379,494

(22) PCT Filed: Jun. 22, 2010

(86) PCT No.: PCT/SE2010/050706
§ 371 (c)(1),
(2), (4) Date: Dec. 20, 2011

(87) PCT Pub. No.: WO2010/151215
PCT Pub. Date: Dec. 29, 2010

(65) Prior Publication Data
US 2012/0120265 A1    May 17, 2012

(30) Foreign Application Priority Data
Jun. 22, 2009   (SE) ........................ 0950480

(51) Int. Cl.
*H04N 5/228*    (2006.01)
(52) U.S. Cl.
USPC ......... 348/208.6; 382/107; 382/236; 382/275
(58) Field of Classification Search
None
See application file for complete search history.

(56) References Cited

U.S. PATENT DOCUMENTS

| | | | |
|---|---|---|---|
| 6,396,961 B1 * | 5/2002 | Wixson et al. | 382/294 |
| 8,023,000 B2 * | 9/2011 | Tamaru | 348/222.1 |
| 8,401,239 B2 * | 3/2013 | Porikli et al. | 382/107 |
| 2003/0202701 A1 | 10/2003 | Schuler | |
| 2005/0275727 A1 * | 12/2005 | Lai et al. | 348/208.1 |
| 2006/0290821 A1 * | 12/2006 | Soupliotis et al. | 348/701 |
| 2007/0132856 A1 * | 6/2007 | Saito et al. | 348/208.99 |
| 2008/0246848 A1 * | 10/2008 | Tsubaki et al. | 348/208.4 |
| 2009/0285450 A1 * | 11/2009 | Kaiser et al. | 382/103 |

FOREIGN PATENT DOCUMENTS

| | | |
|---|---|---|
| EP | 1377036 A2 | 1/2004 |
| WO | WO-2009096893 A1 | 8/2009 |

OTHER PUBLICATIONS

Pulli K, et al, "Projective Surface Matching of Colored 3D Scans", International Conference on pp. 531-538, ISBN 978-0-7695-2327-9, XP010811039;Appendix.

(Continued)

*Primary Examiner* — James Hannett
*Assistant Examiner* — Wesley J Chiu
(74) *Attorney, Agent, or Firm* — Fulbright & Jaworski LLP

(57) ABSTRACT

The present invention provides a method and a system for video stabilization in real time. The method comprises the steps of: estimating an optical flow from an previous image, $I_i$, to a current image, $I_{i+1}$; determining an Euclidean transformation, $F_i$, from the previous image, $I_i$ to the current image, $I_{i+1}$, wherein the Euclidean transformation, $F_i$, comprises a product of rotation, $R_i$, and scaling, $s_i$, and translation, $T_i$; and transforming the current image, $I_{i+1}$, by applying the inverse of the Euclidean transformation, $F_i$, to the current image, $I_{i+1}$, in order to obtain stabilization. The transformation of the current image, $I_{i+1}$, is restricted by using Euclidean matrices $A_i$ and $B_i$, wherein: Ai is used to store absolute frame transformation relative world frame coordinates, $A_o$ is the identity matrix and $A_{i+1}$ is equal to $A_i F_i^{-1}$ for $i \geq 0$ and $B_i$ is used to store visualization window coordinate transformation.

9 Claims, 4 Drawing Sheets

(56) References Cited

OTHER PUBLICATIONS

Sanchiz, et al, "Feature correspondence and motion recovery in vehicle planar navigation", Pattern Recognition, Dec. 1, 1999, vol. 32, Nr. 12, pp. 1961-1977, ISSN 0031-3203; Sections 1, 3.

K. J. Ray Liu, "Interpolation, Geometric Transform, and More on Motion Analysis", Jan. 1, 2006.

European extended Search Report mailed Jul. 2, 2013, during prosecution of European Patent Application No. 10792417.7-1902 / 2446612 PCT/SE2010/050706.

* cited by examiner (a)             (b)

REAL TIME VIDEO STABILIZATION

TECHNICAL FIELD OF THE INVENTION

The present invention relates to real-time video stabilization, and in particular a method and a system for performing video stabilization in real time with a latency of less than one image frame.

BACKGROUND OF THE INVENTION

The purpose of video stabilization is to remove undesired image motion from a video. Such undesired image motion typically originates from shaky motion of the camera that is used to capture the video.

In many applications the computational resources are limited and/or a stabilized real-time representation is required. One example is when analyzing video from aerial reconnaissance systems where there is of utmost importance to remove undesired motion in videos to enable remote control and to provide high quality videos. In such systems, there is a long distance between camera and image object and the objects are typically three-dimensional, which gives different requirements as compared to e.g. production surveillance systems or monitoring systems for microscopes. Moreover the design of an aerial reconnaissance system is always a tradeoff between performance and size. Increasing the image performance often means increasing the size of the payload which is not always possible.

Thus, in current video stabilization systems, a fairly long sequence of sequential image frames of the video is analyzed to compensate one single image frame which adds at least one frame delay to perform the stabilization. One example of such video processing is described in EP1377036.

Moreover, the analysis comprises an estimation of the global motion with determination of a global motion model by assuming a geometrical transformation from one image frame to another and by aligning pair-wise consecutive image frames of the sequence. Thereafter local motion estimation is performed in order to describe the motion that deviates from the global motion model. It is assumed that the intentional motion in the video is slow and smooth and accordingly any high frequency components are removed. Thereby a smoothening of the motion is accomplished.

In view of the foregoing, it is appreciated that the video stabilization of today has a high computational complexity and the video latency due to the video stabilization is substantial.

SUMMARY OF THE INVENTION

One object of the present invention is to provide video stabilization in real time. This object is achieved by the method for video stabilization and a system for video stabilization as defined in the independent claims.

In a method according to the invention the optical flow from a previous image, $I_i$, to a current image, $I_{i+1}$ is estimated. Thereafter a Euclidean transformation matrix, $$F_i = \begin{pmatrix} s_i R_i & T_i \\ 0 & 1 \end{pmatrix} \in R^{3 \times 3},$$

from the previous image, $I_i$, to the current image, $I_{i+1}$ is estimated. The Euclidean transformation matrix, $F_i$, comprises a product of a rotation matrix, $R_i$, and a scaling factor, $s_i$, and a translation matrix, $T_i$. Finally the current image, $I_{i+1}$ is transformed by applying the inverse of the Euclidean transformation matrix, $F_i$, to the current image, $I_{i+1}$ in order to obtain stabilization in real time with a latency of less than one image frame.

A system for video stabilization of a sequence of images that comprises at least one successive image pair with a current image, $I_{i+1}$, and a previous image, $I_i$, i≥0 denoting an image frame number comprises means for estimating the optical flow from the previous image, $I_i$, to the current image, $I_{i+1}$, means for determining a Euclidean transformation matrix, $F_i$, of order three from the previous image, $I_i$, to the current image, $I_{i+1}$, and means for transforming the current image to obtain stabilization.

Thanks to the invention it is possible to provide video stabilization with a minimal latency using equipment suitable for integration in an aerial reconnaissance system.

It is a further advantage of the invention to provide progressive stabilization, i.e. it provides larger stabilization for small variations and less stabilization for large variations.

Yet another advantage is that the computational cost for the estimation of the optical flow and the transformation between images can be performed in real time with a latency of less than one image frame is low.

Embodiments of the invention are defined in the dependent claims. Other objects, advantages and novel features of the invention will become apparent from the following detailed description of the invention when considered in conjunction with the accompanying drawings and claims.

BRIEF DESCRIPTION OF THE DRAWINGS

Preferred embodiments of the invention will now be described with reference to the accompanying drawings, wherein FIG. 1 schematically illustrates the optical flow field due to the geometrical transformation from one image to another, FIG. 2 schematically illustrates one embodiment of a method according to the present invention, FIG. 3a schematically illustrates well conditioned tie-points in a small area "a" within the total area "A" and FIG. 3b schematically illustrates well conditioned tie-points within a larger area "a" within the total area "A".

DETAILED DESCRIPTION OF EMBODIMENTS

One purpose of the present invention is to remove unwanted motion from a sequence of images captured by a camera from a scene in order to obtain a stabilized sequence of images. The sequence of images comprises at least one successive image pair with a current image, $I_{i+1}$, and a previous image, $I_i$, where i≥0 denotes an image frame number.

Figure 1:
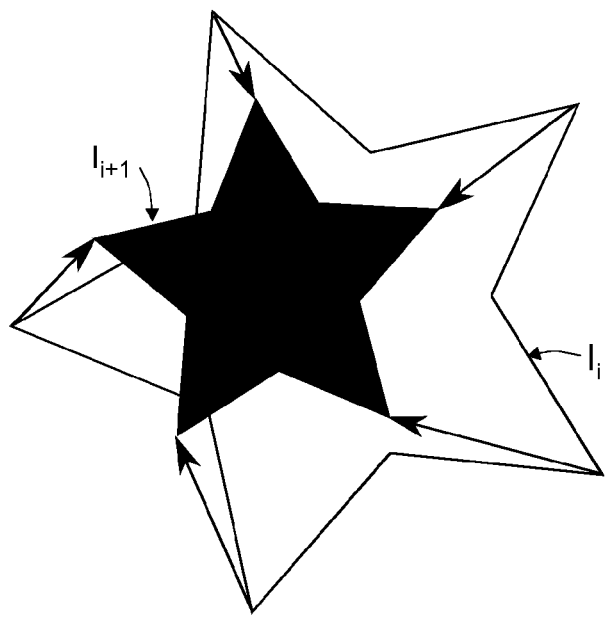

In the present invention, comparison of said images and their corresponding feature points is performed to be able to calculate the optical flow from one image to another. Basically, the optical flow can be interpreted as a geometrical transformation field that describes apparent motion of image brightness patterns or feature points in an image sequence due to relative motion between the camera and the scene. This is in FIG. 1 schematically illustrated by a vector diagram of the geometrical transformation due to translation, scaling and rotation of an object from a previous image, $I_i$, to a current image, $I_{i+1}$.

A tie point is for the purpose of this application a feature point that is suitable for being tracked in another image during camera motion (translation, rotation and zoom). Such tie points are commonly referred to as good feature points.

The present invention is described with the assumption that the scene is stationary and the optical flow is due to camera motion. Smaller parts of the scene can include motion such as moving vehicles but are in the method of this invention preferably treated as outliers and thus ignored. An exception to this general rule is when a moving object is the point of interest and stabilization is performed relative to its motion.

Figure 2:
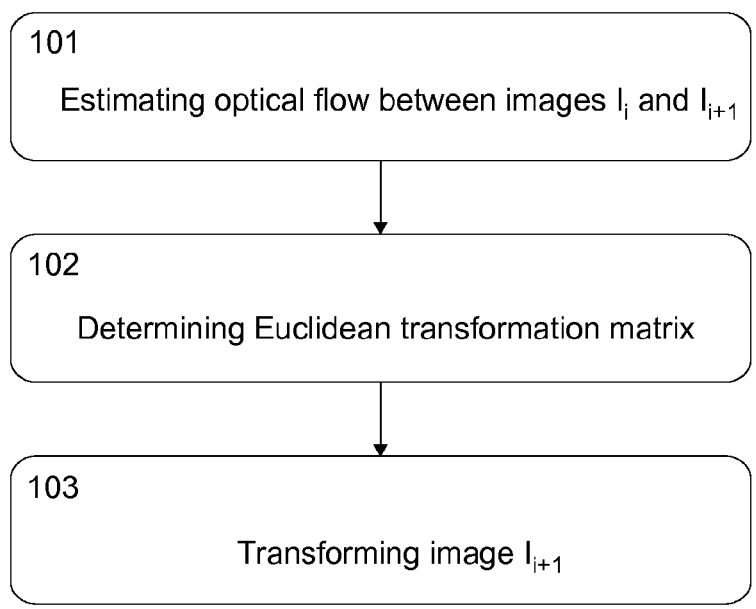

Referring to FIG. 2, a method for video stabilization according to the present invention comprises the steps of:

101 estimating an optical flow from the previous image, $I_i$, to the current image, $I_{i+1}$;

102 determining an Euclidean transformation from the previous image, $I_i$, to the current image, $I_{i+1}$, wherein the Euclidean transformation, $F_i$, is a product of at least rotation, $R_i$, and scaling, $s_i$, and translation, $T_i$;

103 transforming the current image, $I_{i+1}$, by applying the inverse of the Euclidean transformation, $F_i$, to the current image, $I_{i+1}$ to obtain stabilization.

The Euclidean transformation can be determined with respect to seven degrees of freedom, i.e. seven parameters: roll, pitch, yaw, translation in three directions and scaling. The translation typically comprises three orthogonal directions (x, y, z).

In one implementation of the method according to the present invention the Euclidean transformation is limited to four parameters, i.e. to translation in two orthogonal directions (x, y), rotation and scaling, and hence the method comprises the steps of:

101 estimating an optical flow from the previous image, $I_i$, to the current image, $I_{i+1}$;

102 determining an Euclidean transformation matrix, $$F_i = \begin{pmatrix} s_i R_i & T_i \\ 0 & 1 \end{pmatrix} \in R^{3 \times 3},$$

from the previous image, $I_i$, to the current image, $I_{i+1}$, wherein the Euclidean transformation matrix, $F_i$, at least comprises a product of a rotation matrix, $R_i$, and a scaling factor, $s_i$, and a translation matrix, $T_i$; and 103 transforming the current image, $I_{i+1}$, by applying the inverse of the Euclidean transformation matrix, $F_i$, to the current image, $I_{i+1}$; whereby video stabilization is obtained with a latency of less than one image frame.

Figure 3:
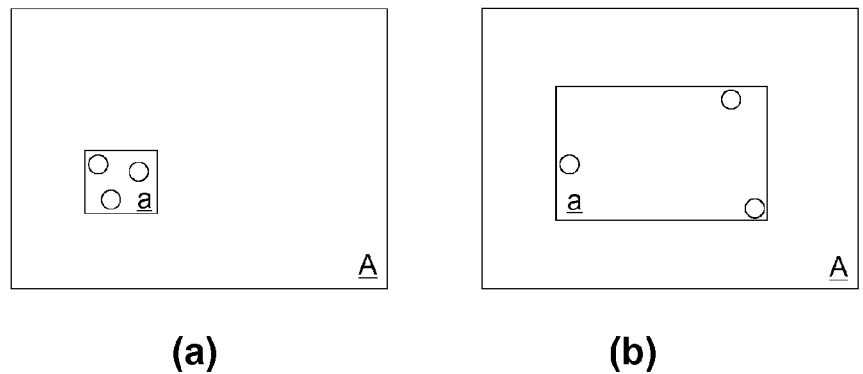

Referring to FIG. 3a-b, to accurately determine the Euclidean transformation matrix F the number of tie points should be at least three and be well spread over the image (well conditioned). Before determining F the area of the minimum square "a" that encloses the points is calculated and compared with the total area of the image, "A". If the number of tie-points is less than three or "a/A" is less than a certain fraction the factor $s_i R_i$ is set to the 3×3 identity matrix. This limit is preferably set to 0.1, more preferably 0.5.

A final check is performed to ensure that F is well conditioned by checking that the determinant of F is not too small. Preferably the determinant is from 0.1 to 0.5. If the determinant is too small F is set to the identity 4×4 matrix.

As mentioned above outliers can be removed. Outliers can be regarded as points that do not match the global motion parameters calculated, i.e. a point p multiplied by the matrix F does not map to the tracked position in the next frame. Outliers appear due to noise or non-static objects in the scene. A small deviation from calculated position may be tolerated. This deviation, which often is referred to as a residual, may be up to a few pixels (0-5).

Although above expressed as a Euclidean matrix, it should be appreciated that the Euclidean transformation is not limited to the matrix notation, but may be expressed as a product of the rotation, $R_i$, and the scaling, $s_i$, and the translation $T_i$, according to $F_i = s_i R_i - 1 + T_i$, where $s_i \in R$, $F_i \in R^{2 \times 2}$ and $T_i \in R^{3 \times 1}$. Hereinafter the matrix notation is used in order to describe the method. Further it should be appreciated that although the following description is limited to four parameters or less the method applies for up seven parameters.

The estimated optical flow covers at least a portion of said images. If the optical flow field does not cover the whole image a step by step reduction of the number of parameters can be performed. One example of such a reduction is to, by way of example if the coverage is less than 50%, in a first step set the scale to 1 (no scaling), and, by way of example if the coverage is less than 20%, in an optional second step set R to the unit matrix (no rotation).

Figure 4:
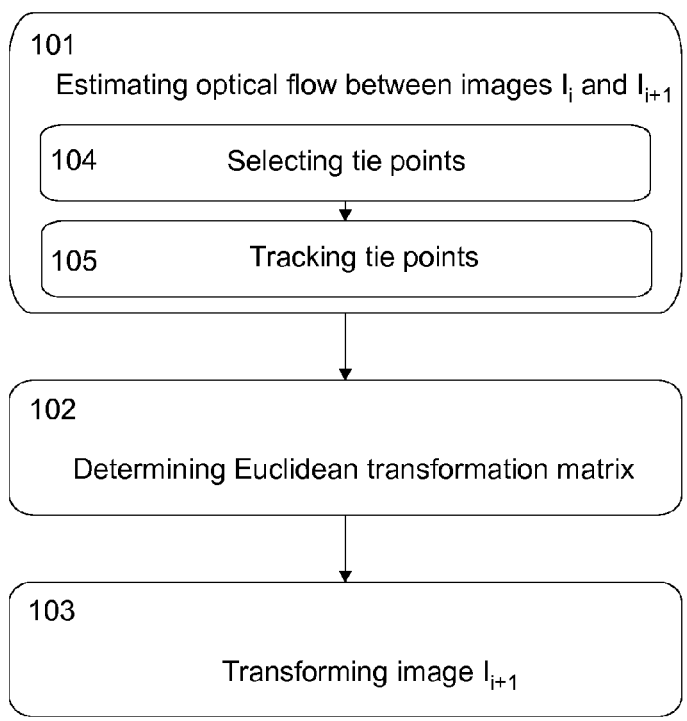
FIG. 4 schematically illustrates another embodiment of a method according to the present invention, FIG. 5 schematically illustrates x-translation due to movement of an object of the scene.

Several methods for estimating optical flow between successive images are known in the field. Referring to FIG. 4, in one embodiment of the method according to the present invention the step of estimating the optical flow further comprises the steps of 104 selecting tie points in the current image, $I_{i+1}$, and the previous image, $I_i$, and, after the step of selecting 105, tracking corresponding tie points in the current image, $I_{i+1}$, and the previous image, $I_i$. A texturedness criteria, such as the criteria proposed by Tomasi and Shi (J. Shi and C. Tomasi, Good features to track, Technical report, Ithaca, N.Y., USA, 1993), may be used for selecting the tie points. Basically this is based on that the gradient for a feature point fulfilling the criteria is large in two perpendicular directions. To be able to decide which points have good texturedness different methods can be used. For example Lowe's Scale Invariant Feature Transform (SIFT) method can be used for finding tie points and assigning feature point descriptors. Another alternative is Speeded Up Robust Features (SURF).

Corresponding tie points can be tracked using a feature tracking algorithm. The tracking may be performed by using image pyramids. One example of such is a pyramidal implementation of the Lucas-Kanade method, however not limited to this.

The optical flow can be determined without using tie points. Instead a more trivial selection of points to track can be used. By way of example, the transformation of an array of points distributed over the image can be determined. In the case of pure translation in one direction selection of only one point may be necessary.

Once there are reliable features selected it is possible to establish correspondences between two separate images and to determine the Euclidean transformation using methods like RANSAC, which stands for Random Sample Consensus, or an least square estimation. The main idea behind RANSAC is to use a minimal number of points from a set of data points with unknown quality, which may be selected and refined using feature point descriptors like in Lowe's Scale Invariant Feature Transform (SIFT) method or Speeded Up Robust Features (SURF), to estimate some given model, and then count how many of the remaining data points that are compatible with the estimated model.

The Euclidean transformation matrix contains information about translation and rotation between the images of a successive image pair and hence can move points of the previous image to the current image. Translation and rotation can be handled separately. Thereby translation in different directions and rotation can be handled differently, which is an advantage since the motion variations typically are dominant in one translation direction.

The inverse of the Euclidean transformation matrix $F_i$ applied to the current image $I_{i+1}$, eliminates the motion between the successive images. Thus full stabilization of the motion between image frames can be obtained. However, if the camera moves too much, for instance, during a panning, the stabilization may move the current images outside of a computer screen window.

The transformation of the current image can be restricted by using Euclidean matrices $A_i$ and $B_i$ of order three. As indicated above, i≥0 denotes an image frame number. The Euclidean matrix $A_i$ is used to store absolute frame transformation relative world frame coordinates, which is equal to the coordinate system of the previous image, and the Euclidean matrix $B_i$ is used to store visualization window coordinate transformation.

The matrix $A_{i+1}$ is defined as follows:

Set $A_0$ to the identity matrix (the initial motion is zero).

Define $A_{i+1} = F_i^{-1}$ for i≥0.

The Euclidean matrix $B_i$ is determined by the translation $x_i$, $y_i$ and the rotation angle $\theta_i$ for the previous image $I_i$. In order to calculate $B_{i+1}$, one or a combination of the translations $x_{i+1}$, $y_{i+1}$ and the rotation angle $\theta_{i\ i+1}$ for the current image $I_{i+1}$ are calculated.

By way of example, the Euclidean matrix determines the position of a virtual camera that observes the scene from above and is centered at the translation part and rotation part of $B_i$, respectively. For each i, $A_i$ is transformed and $B_i$ is used. In this process two extreme cases can be noted. If $B_i$ is equal to the identity matrix the visualization window is centered at the origin and a full stabilization will be performed. After some panning, the image will be moved outside the screen. If $B_i$ is equal to $A_i$, the visualization window will be centered at the principal point of $I_i$ and it will be rotated in the same way as the transformed image. Hence no motion will be compensated at all.

Consequently, the Euclidean matrix $B_i$ that controls the visualization window can be adapted to take care of panning, but without restricting the efficiency of stabilization for small movements.

Figure 5:
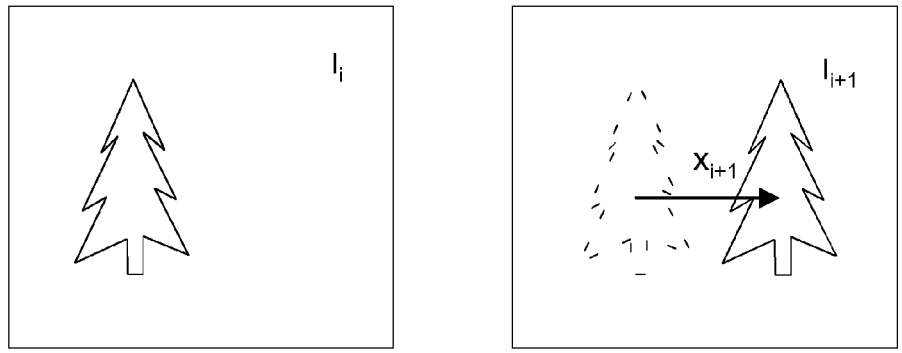

Referring to FIG. 5, the translation $x_{i+1}$ is calculated by letting x be equal to the x-translation $u_i$ given by $A_i$ reduced by $x_i$. If the absolute value of x is larger than a predetermined constant $R_x$ that determines the maximum difference in x-position between the transformed image and the camera, $x_{i+1}$ is set to the $u_i$ reduced by $R_x$ if x is larger than 0 and increased by $R_x$ if x is smaller than 0. Otherwise $x_{i+1}$ is set to the sum of $x_i$ and a product of a constant C, and a function α of x, $F_x$, and $R_x$. $F_x$ is a predetermined percentage of $R_x$ defining maximum stabilization, and $C_x$ is a predetermined constant defining the effect of stabilization. One example of the function α is defined in the following. Step-by-step, the calculation is as follows.

Let $x_{i+1} = u_i - x_i$, where $u_i$ is a x-translation given by $A_i$.

Set $x_{i+1} = x_{i+1} \begin{cases} u_i - \text{Sign}(x)R_x & \text{if } |x| > R_x; \\ x_i + \alpha(x, F_x, R_x)C_x & \text{otherwise;} \end{cases}$ where $R_x$ is a predetermined constant, $F_x$ is a predetermined percentage of $R_x$, $C_x$ is a predetermined constant, and α is a function of x, $F_x$, and $R_x$ defined by $$\alpha(e, f, r) = \begin{cases} 0 & \text{if } |e| > fr; \\ e\left(\frac{1}{2}\text{Sin}\left(\frac{|e| - fr}{r(1-f)}\pi - \frac{\pi}{2}\right) + \frac{1}{2}\right) & \text{otherwise,} \end{cases}$$

where e, f and r are variables.

The exemplified function α is a smooth function from the flat interval to the non-flat interval and thus performs a smooth transition from full stabilization to no stabilization.

Accordingly the translation $y_{i+1}$ and the rotation $\theta_{i\ i+1}$ are calculated as follows:
$y_{i+1} = v_i - \text{Sign}(y)R_y$, if $|y| > R_y$, or else $y_{i+1} = y_i + \alpha(y, F_y, R_y)C_y$, wherein $y_i$ is a y-translation given by $A_i$, $y = v_i - y_i$, $R_y$ is a predetermined constant determining the maximum difference in y-position between the transformed image and the camera, α is a function of y, $F_y$, and $R_y$, $F_y$ is a predetermined percentage of $R_y$ defining maximum stabilization, and $C_y$ is a predetermined constant defining the effect of stabilization; and
$\theta_{i+1} = \text{Sign}(\theta_i)R_\theta$ if $|\theta_i| > R_\theta$, or else $\theta_{i+1} = \theta_i + \alpha(\theta, F_\theta, R_\theta)C_\theta$, wherein $w_i$ is a θ-rotation given by $A_i$, $\theta = w_i - \theta_i$ converted to the interval $[-\pi, \pi]$, $R_\theta$ is a predetermined constant determining the maximum difference in θ-rotation between the transformed image and the camera, α is a function of θ, $F_\theta$, and $R_\theta$, $F_\theta$ is a predetermined percentage of $R_\theta$ defining maximum stabilization, and $C_\theta$ is a predetermined constant defining the effect of stabilization.

If α is set to a constant, e.g. 0.8, part of the translation from one image to the other will be present in the transformed image. This will give a damping of oscillating translations and for translation that proceeds in one direction the compensation will be additive.

The transformation of the current image as described above may be progressive in order to perform larger stabilization for small variations and less stabilization for large variations. The computational cost is so low that a latency of the transformation of the current image is less than one frame.

As mentioned above, the optical flow is determined from a portion of the image. In one embodiment of the invention the constant α is dependent on the location of the image portion within the whole image. By way of example α is larger when the image portion is in an outer region of the image and larger when the image portion is in an inner region. This will compensate for irregular motion while constant motion is left merely uncompensated. One example of such compensation is when high-frequency motion in the y-direction is removed and low-frequency motion in the x-direction is left uncompensated.

Figure 6:
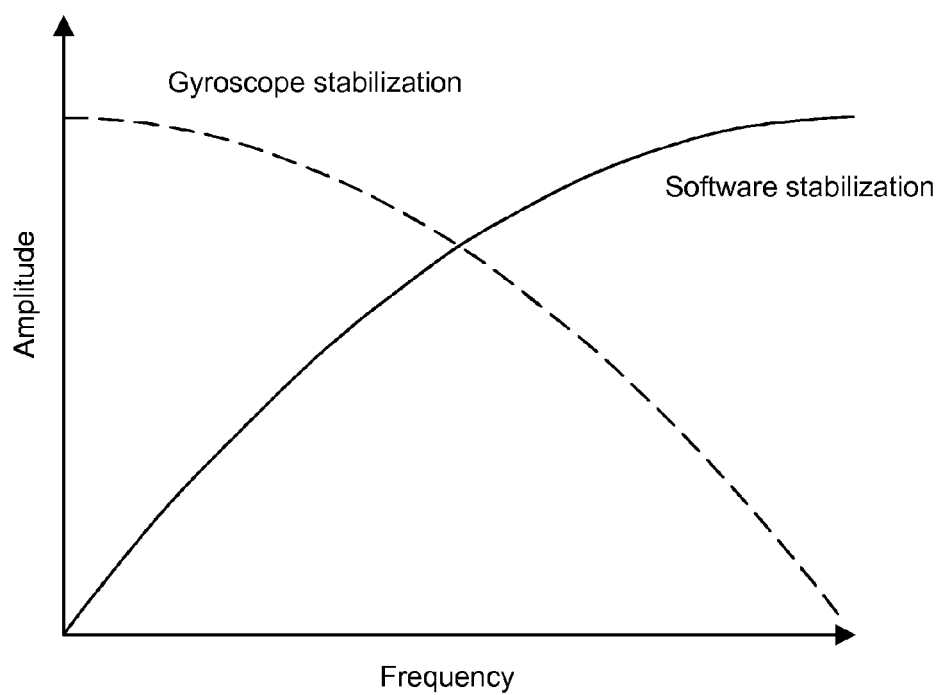
FIG. 6 schematically illustrates the effect of gyroscope stabilization and software stabilization according to the present invention, FIG. 7 schematically illustrates a system for video stabilization according to the present invention.

To further improve the method of the present invention the camera position and/or orientation, and hence also the translation of the camera, can be provided, e.g. by using GPS-information, accelerometers, gyroscopes, etc. Also the distance from the camera to the image may be one input. FIG. 6 schematically illustrates the effect of the above described software stabilization and gyroscope stabilization. From this it is appreciated that accelerators or gyros can be used as a complement to the software stabilization since gyroscopes and accelerometers and gyroscopes efficiently removes high frequency noise and the software stabilization can be used to remove the low frequency noise.

A system for video stabilization of a sequence of images captured by a camera according to the present invention, where the sequence of images comprising at least one successive image pair with a current image, $I_{i+1}$, and a previous image, $I_i$, $i \geq 0$ denoting an image frame number, comprises:
- an estimation module adapted to estimate the optical flow from the previous image, $I_i$, to the current image, $I_{i+1}$,
- a calculation module adapted to determine a Euclidean transformation matrix, $F_i$, of order three from the previous image, $I_i$, to the current image, $I_{i+1}$;
- a transformation module adapted to transform the current image to obtain stabilization by applying the inverse of the Euclidean transformation matrix.

Figure 7:
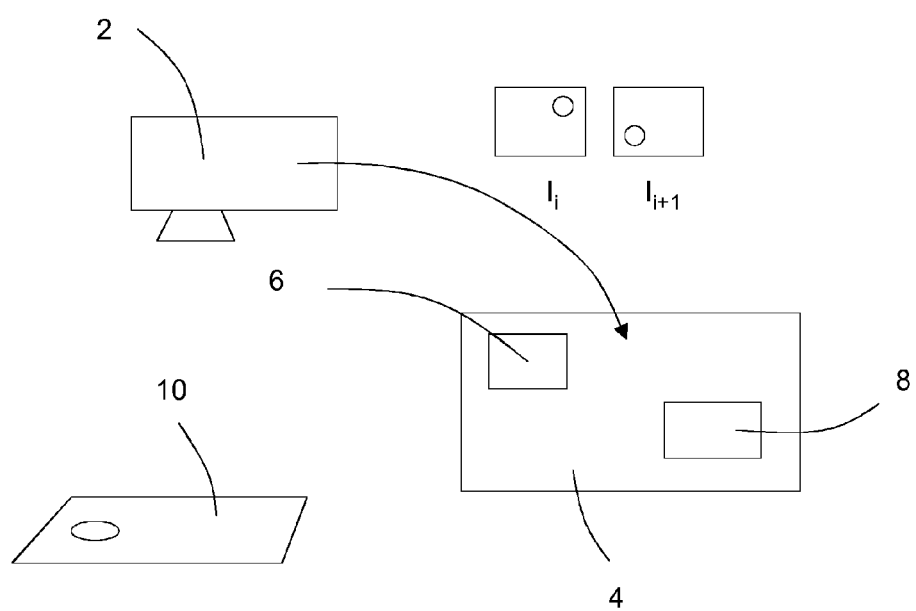

Referring to FIG. 7, in one embodiment of the present invention said modules for estimating, determining and transforming are included in a ground unit 2 and said images are transferred from a camera unit 4 to the ground unit 2. The current image, $I_{i+1}$, and the previous image, $I_i$, are at least temporarily stored in a memory unit 6 of the ground unit 2 while processing the images in a processing unit 8 of the ground unit 2. The processing unit generates a transferred image which can be displayed or stored together with previous and following images to form a stabilized video.

By using the set-up of FIG. 7 where most of the image processing is made in the ground unit the requirements on the computational power in the camera unit are limited. Thereby the cost, size and weight of the camera unit can be decreased while improving or at least maintaining image quality.

In one embodiment the steps of estimating the optical flow and determining the Euclidean transformation is used to move a camera in accordance with a geometrical transformation in the image. This can be done in combination with compensation of the image. For example this can be used to let the camera follow a certain object in the image.

While the invention has been described in connection with what is presently considered to be the most practical and preferred embodiments, it is to be understood that the invention is not to be limited to the disclosed embodiments, on the contrary, it is intended to cover various modifications and equivalent arrangements within scope of the appended claims.

The invention claimed is:

1. A method for video stabilization of a sequence of images captured by a camera, the sequence of images comprising at least one successive image pair with a current image, $I_{i+1}$, and a previous image, $I_i$, $i \geq 0$ denoting an image frame number, and the method comprising the steps of:
- estimating an optical flow from the previous image, $I_i$, to the current image, $I_{i+1}$;
- determining an Euclidean transformation, $F_i$, from the previous image, $I_i$, to the current image, $I_{i+1}$, wherein the Euclidean transformation, $F_i$, comprises a product of at least a rotation matrix, $R_i$, and a scaling factor, $s_i$, and a translation matrix, $T_i$;
- restricting the transformation of the current image, $I_{i+1}$, by using Euclidean matrices $A_i$ and $B_i$, wherein: $A_i$ is used to store absolute frame transformation relative world frame coordinates, $A_0$ is the identity matrix and $A_{i+1}$ is equal to $A_i F_i^{-1}$ for $i \geq 0$ and $B_i$ is used to store visualization window coordinate transformation; and
- transforming the current image, $I_{i+1}$, by applying the inverse of the Euclidean transformation, $F_i$, to the current image, $I_{i+1}$.

2. The method according to claim 1, wherein $F_i$ is a matrix of order three, and the $F_i$ comprises a product of a rotation matrix, $R_i$, and a scaling factor, $s_i$, and a translation matrix, $T_i$.

3. The method according to claim 1 or 2, wherein the step of estimating comprises the sub-steps of:
- selecting tie points in the current image, $I_{i+1}$, and the previous image, $I_i$; and
- tracking corresponding tie points in the current image, $I_{i+1}$, and the previous image, $I_i$.

4. The method according to claim 1, wherein $B_i$ is set to the identity matrix to obtain full stabilization.

5. The method according to claim 1, wherein the step of restricting comprises, in order to calculate $B_{i+1}$, one or a combination of the sub-steps of:
- calculating translation $x_{i+1}$ as follows: $x_{i+1}=u_i-\text{Sign}(x)R_x$ if $|x|>R_x$, or else $x_{i+1}=x_i+\alpha(x,F_x,R_x)C_x$, wherein $u_i$ is a x-translation given by $A_i$, $x=u_i-x_i$, $R_x$ is a predetermined constant determining the maximum difference in x-position between the transformed image and the camera, $\alpha$ is a function of x, $F_x$, and $R_x$, $F_x$ is a predetermined percentage of $R_x$ defining maximum stabilization, and $C_x$ is a predetermined constant defining the effect of stabilization;
- calculating translation $y_{i+1}$ as follows: $y_{i+1}=v_i-\text{Sign}(y)R_y$ if $|y|>R_y$, or else $y_{i+1}=y_i+\alpha(y,F_y,R_y)C_y$, wherein $y_i$ is a y-translation given by $A_i$, $y=v_i-y_i$, $R_y$ is a predetermined constant determining the maximum difference in y-position between the transformed image and the camera, $\alpha$ is a function of y, $F_y$, and $R_y$, $F_y$ is a predetermined percentage of $R_y$ defining maximum stabilization, and $C_y$ is a predetermined constant defining the effect of stabilization; and
- calculating rotation angle $\theta_{i+1}$ as follows: $\theta_{i+1}=w_i-\text{Sign}(\theta_i)R_\theta$ if $|\theta_i|>R_\theta$, or else $\theta_{i+1}=\theta_i+\alpha(\theta,F_\theta,R_\theta)C_\theta$, wherein $w_i$ is a $\theta$-rotation given by $A_i$, $\theta=w_i-\theta_i$ converted to the interval $[-\pi,\pi]$, $R_\theta$ is a predetermined constant determining the maximum difference in $\theta$-rotation between the transformed image and the camera, $\alpha$ is a function of $\theta$, $F_\theta$, and $R_\theta$, $F_\theta$ is a predetermined percentage of $R_\theta$ defining maximum stabilization, and $C_\theta$ is a predetermined constant defining the effect of stabilization.

6. The method according to claim 5, wherein the transformation of the current image is progressive in order to perform larger stabilization for small variations and less stabilization for large variations.

7. The method according to claim 5, wherein the function $\alpha$ is defined by $\alpha(e,f,r)=0$ if $|e|<fr$ or else $$e\left(\frac{1}{2}\text{Sin}\left(\frac{|e|-fr}{r(1-f)}\pi - \frac{\pi}{2}\right) + \frac{1}{2}\right)$$

in order to give a smooth transition from full stabilization to no stabilization.

8. The method according to claim 1, further comprising the step of removing outliers.

9. A system for video stabilization of a sequence of images captured by a camera, the sequence of images comprising at least one successive image pair with a current image, $I_{i+1}$, and a previous image, $I_i$, $i \geq 0$ denoting an image frame number, wherein the system comprises:
- an estimation module adapted to estimate the optical flow from the previous image, $I_i$, to the current image, $I_{i+1}$,
- a calculation module adapted to determine an Euclidean transformation matrix, $F_i$, of order three from the previous image, $I_i$, to the current image, $I_{i+1}$;

wherein the calculation module is further adapted to:

determine an Euclidean transformation, $F_i$, from the previous image, $I_i$, to the current image, $I_{i+1}$, wherein the Euclidean transformation, $F_i$, comprises a product of at least a rotation matrix, $R_i$, and a scaling factor, $s_i$, and a translation matrix, $T_i$;

restrict the transformation of the current image, $I_{i+1}$, by using Euclidean matrices $A_i$ and $B_i$, wherein:

$A_i$ is used to store absolute frame transformation relative world frame coordinates, $A_0$ is the identity matrix and $A_{i+1}$ is equal to $A_i F_i^{-1}$ for $i \geq 0$ and $B_i$ is used to store visualization window coordinate transformation; and a transformation module adapted to transform the current image, $I_{i+1}$ by applying the Euclidean transformation matrix, $F_i$, to the current image, $I_{i+1}$, to obtain stabilization.

\* \* \* \* \*